US011116235B2

(12) United States Patent
Smith et al.

(10) Patent No.: US 11,116,235 B2
(45) Date of Patent: Sep. 14, 2021

(54) FOOD PRODUCTS WITH YOGURT WHEY

(71) Applicant: General Mills, Inc., Minneapolis, MN (US)

(72) Inventors: Erika B Smith, Champlin, MN (US); Wenyi Wang, Blaine, MN (US); Vikramaditya Ghosh, Shoreview, MN (US)

(73) Assignee: General Mills, Inc., Minneapolis, MN (US)

( * ) Notice: Subject to any disclaimer, the term of this patent is extended or adjusted under 35 U.S.C. 154(b) by 1371 days.

(21) Appl. No.: 14/893,846

(22) PCT Filed: May 24, 2013

(86) PCT No.: PCT/US2013/042579
§ 371 (c)(1),
(2) Date: Nov. 24, 2015

(87) PCT Pub. No.: WO2014/189520
PCT Pub. Date: Nov. 27, 2014

(65) Prior Publication Data
US 2016/0128346 A1  May 12, 2016

(51) Int. Cl.
A23C 21/08 (2006.01)
A23L 2/52 (2006.01)
A23G 3/46 (2006.01)
A23C 21/02 (2006.01)
A21D 2/26 (2006.01)
A23C 9/13 (2006.01)
A23C 19/09 (2006.01)
A23L 2/66 (2006.01)
A23L 23/10 (2016.01)
A23L 7/10 (2016.01)
A23L 33/19 (2016.01)
A23L 23/00 (2016.01)
A21D 2/34 (2006.01)

(52) U.S. Cl.
CPC .............. *A23C 21/08* (2013.01); *A21D 2/263* (2013.01); *A21D 2/34* (2013.01); *A23C 9/1307* (2013.01); *A23C 19/0917* (2013.01); *A23C 21/026* (2013.01); *A23G 3/46* (2013.01); *A23L 2/52* (2013.01); *A23L 2/66* (2013.01); *A23L 7/10* (2016.08); *A23L 7/101* (2016.08); *A23L 23/00* (2016.08); *A23L 23/10* (2016.08); *A23L 33/19* (2016.08); *A23V 2002/00* (2013.01)

(58) Field of Classification Search
CPC ........... A23C 21/08; A21D 2/34; A21D 2/263
See application file for complete search history.

(56) References Cited

U.S. PATENT DOCUMENTS

| 1,763,633 | A |  | 6/1930 | Simmons |
| 2,128,845 | A |  | 8/1938 | Myers et al. |
| 2,555,514 | A |  | 6/1951 | Sharp et al. |
| 2,826,503 | A |  | 3/1958 | Roberts et al. |
| 3,061,442 | A | * | 10/1962 | Ward ................. A21D 2/02 426/583 |
| 3,537,860 | A | * | 11/1970 | Moore .................. A23C 1/12 159/17.3 |
| 4,497,836 | A |  | 2/1985 | Marquardt et al. |
| 5,580,592 | A | * | 12/1996 | Nassauer ............. A23C 1/045 159/48.1 |
| 6,475,539 | B1 |  | 11/2002 | DeWille et al. |
| 7,081,355 | B2 |  | 7/2006 | Jorgensen et al. |
| 7,094,439 | B2 |  | 8/2006 | Akashe et al. |
| 7,582,326 | B2 |  | 9/2009 | Brown et al. |
| 7,883,874 | B2 |  | 2/2011 | Gibson et al. |
| 8,591,981 | B2 |  | 11/2013 | Sprenger et al. |
| 2004/0161422 | A1 |  | 8/2004 | Ranganathan |
| 2007/0184177 | A1 |  | 8/2007 | Harrison et al. |
| 2008/0107769 | A1 | * | 5/2008 | Tay ..................... A23C 9/1585 426/2 |
| 2009/0297660 | A1 |  | 12/2009 | Silver et al. |
| 2010/0215738 | A1 |  | 8/2010 | Ritter et al. |
| 2010/0255147 | A1 |  | 10/2010 | Lamb et al. |
| 2011/0065152 | A1 |  | 3/2011 | Avalakki et al. |
| 2011/0217416 | A1 |  | 9/2011 | Christensen et al. |
| 2011/0287147 | A1 |  | 11/2011 | Pannell et al. |
| 2012/0040051 | A1 |  | 2/2012 | Chen et al. |
| 2012/0129802 | A1 |  | 5/2012 | Giacomelli et al. |

FOREIGN PATENT DOCUMENTS

| CA | 2481023 | 9/2003 |
| EP | 1352967 | 10/2003 |
| GB | 534214 | 3/1941 |
| GB | 2293825 | 4/1996 |
| WO | WO 2008/037839 | 4/2008 |
| WO | WO 2008/132115 | 11/2008 |
| WO | 2009/004566 | 1/2009 |
| WO | 2009/147157 | 12/2009 |

(Continued)

OTHER PUBLICATIONS

Cambria Bold "What to Do With Whey Greek Yogurts Popularity and Its' Acid Whey Problem" May 24, 2013 https://www.thekitchn. com/what-to-do-with-whey-greek-yogurts-dark-side-food-news-190013 (Year: 2013).*
Komatsu et al. JP 2011-109935 Derwent Abstract (Year: 2011).*
Alonso et al., "*Residual Yogurt Whey for Lactic Acid Production*", Biomass and Bioenergy, vol. 34, pp. 931-938, 2010.
Asada et al., "*Acceleration of Hericium Erinaceum Mycelial Growth in Submerged Culture Using Yogurt Whey as an Alternative Nitrogen Source*", Advances in Bioscience and Biotechnology, vol. 3, No. 7, 2012.
Astley, "*Chobani, Dannon Attempt to Defuse Greek Yogurt 'Acid Whey' Environmental Concerns*", Food Navigator, May 2013.
Butler, "*Is Greek Yogurt Better Than Regular*", www.motherjones.com/blue-marble/2010/06/greek-yogurt-better-regular.
Salad in a Jar, "*18 Ways to Use Whey-a By-Product of Greek Yogurt*", 2011.

(Continued)

Primary Examiner — Felicia C Turner
(74) Attorney, Agent, or Firm — Diederiks & Whitelaw, PLC; Annette M. Frawley, Esq.

(57) ABSTRACT
A food product comprising a neutralized yogurt whey.

13 Claims, No Drawings

(56) References Cited

FOREIGN PATENT DOCUMENTS

| WO | 2010/045025 | 4/2010 |
|---|---|---|
| WO | 2011/003426 | 1/2011 |
| WO | 2011/099876 | 8/2011 |
| WO | WO 2011/093907 | 8/2011 |
| WO | WO 2012/010597 | 1/2012 |
| WO | WO 2012/089784 | 7/2012 |
| WO | 2013/163659 | 10/2013 |

OTHER PUBLICATIONS

Kajal et al., "*Evaluation of Some Chemical Parameters of Powder Milk Available in Mymensingh Town*", J. Bangladesh Agril. Univ., vol. 10, No. 1, pp. 95-100, 2012.
Mahoney, "*Galactosyl-Oligosaccharide Formation During Lactose Hydrolysis: A Review*", Food Chemistry, vol. 63, No. 2, pp. 147-154, 1998.
Leiva et al., "*Formation of Oligosaccharide During Enzymic Hydrolysis of Milk Whey Permeates*", Process Biochemistry, vol. 30, No. 8, pp. 757-762, 1995.
Seckin et al., "*Effect of Some Prebiotics Usage on Quality Properties of Concentrated Yogurt*", Journal of Animal and Veterinary Advances, vol. 10, No. 9, pp. 1117-1123, 2011.
Hugenholtz et al., "*Metabolic Engineering of Lactic Acid Bacteria for the Production of Nutraceuticals*", Antonie van Leeuwenhoek, No. 82, pp. 217-335, 2002.

* cited by examiner

FOOD PRODUCTS WITH YOGURT WHEY

CROSS-REFERENCE TO RELATED APPLICATIONS

This application represents a National Stage application of PCT/US2013/042579 entitled "Food Products with Yogurt Whey" filed May 24, 2013, pending.

BACKGROUND

Separated yogurt production produces about two pounds of whey for every pound of yogurt produced. The whey by-product produced from yogurt is a relatively new by-product resulting from the recent popularity of separated yogurt quite often referred to as "Greek" yogurt. Traditional yogurt production via cup set or stirred-style vat set processes does not produce a yogurt whey by-product stream. Additionally, yogurt whey is unlike whey produced from cheese manufacturing. Yogurt whey contains less solids and is more acidic than whey produced from the production of cheese. In contrast, sweet whey is manufactured during the production of rennet types of hard cheese like cheddar or Swiss cheese and has a higher solids content and lower acidity. Acid whey is produced during the production of acid types of cheese such as cottage cheese, and contains a higher solids content than yogurt whey. Currently, yogurt whey is used as an agricultural liquid fertilizer. This liquid yogurt whey does not have suitable characteristics for use in processed foods and animal feed, like other whey by-products.

SUMMARY

The present disclosure relates to a food product including a neutralized yogurt whey. The food product can be bakery product, a beverage product, a snack product, a confectionery product, a soup product, a dry meal product, a cereal or a dairy product, for example.

In many embodiments, a food product includes neutralized yogurt whey. The neutralized yogurt whey has the following composition: a pH of 6.0 or greater; at least 100 mg calcium per 100 grams of yogurt whey; at least 1% wt galactose; and at least 6% wt solids.

In some embodiments, the yogurt whey in the food product has the following composition: a pH of 6.2 or greater; at least 3% wt calcium; at least 5% wt galactose; at least 95% wt solids; and less than 5% wt protein.

These and various other features and advantages will be apparent from a reading of the following detailed description.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

The term "yogurt whey" refers to the acid whey separation byproduct generated from the traditional method of making Greek yogurt. Yogurt whey is a dilute, acidic liquid containing carbohydrates, milk minerals, protein and cultures.

The term "neutralized yogurt whey" refers to yogurt whey that has been neutralized with a basic material to raise the pH of the yogurt whey.

As used herein, a "food product" is a food produced by combining two or more edible ingredients.

The present disclosure relates to a food product including a neutralized yogurt whey. The food product can be a bakery product, a beverage product, a snack product, a confectionery product, a soup product, a dry meal product, or a dairy product, for example. The neutralized yogurt whey can be provided in the food product in any useful level. In many embodiments the neutralized yogurt whey is a free flowing solid having a moisture content of less than 5% wt or less than 3% wt. In some embodiments the neutralized yogurt whey is liquid flowing material having a solids % in a range from about 20% wt to 90% wt. While the present disclosure is not so limited, an appreciation of various aspects of the disclosure will be gained through a discussion of the examples provided below.

Acid whey or yogurt whey is generated in the food industry as a by-product of the traditional method to make Greek yogurt which involves a whey separation process. The resulting whey by-product is a dilute, high acid liquid containing lactose and milk minerals and is referred to herein as "yogurt whey". Greek yogurt is produced by the fermentation of milk with yogurt cultures. Three pounds of milk produces one pound of Greek Yogurt and two pounds of acid or yogurt whey. Greek yogurt is separated from yogurt whey and the Greek yogurt is then packaged into containers or further processed.

This disclosure describes a neutralized and dry yogurt whey concentrate or powder that can be utilized in a food product. The neutralized and dry yogurt whey concentrate or powder can be utilized as a bulking agent, sweetening agent or a mineral fortificant (calcium and phosphorus) for food products. To accomplish this, the separated yogurt whey is pasteurized, concentrated and neutralized with a basic material.

In some embodiments the neutralized liquid or powder concentrate product can replace sweet whey in food products, for example. Applicant has discovered no significant sensory differences between 10% w/w solutions of dried sweet whey and the neutralized yogurt whey. In addition, the color of neutralized yogurt whey was more similar to sweet whey than whey permeate. Sweet whey and neutralized yogurt whey have similar opacity and whiteness.

Yogurt whey that is separated from Greek yogurt includes a relatively large number of yogurt cultures or colony forming units of yogurt cultures. The yogurt cultures used to form Greek yogurt are *Lactobacillus delbrueckii* subsp. *bulgaricus* and *Streptococcus thermophilus* bacteria, among others. In many embodiments, yogurt cultures are present in the yogurt whey.

Yogurt whey has a pH that is more acidic than whey produced from cheese (i.e., sweet whey). The pH of yogurt whey can be less than 5.0 or less than 4.8 or 4.5 or less. The pH of yogurt whey can be in a range from 4.0 to 5.0 or from 4.3 to 4.7 or from 4.4 to 4.6. Another way to describe acidity is "titratable acidity" or TA which refers to a total acidity and is expressed as %. Titratable acidity can be determined for yogurt whey by titration with a 0.1 N NaOH solution to a 8.2-8.4 pH using phenolphthalein indicator. Yogurt whey has a TA that is greater than a TA of sweet whey. The TA of yogurt whey is at least about 0.2% or at least 0.3% or at least 0.4%. The TA of yogurt whey can be in a range from 0.2 to 0.5% or from 0.3 to 0.5%.

Yogurt whey that has just been separated from Greek yogurt has a solids content of less than 10% wt or less than 8% wt or about 6% wt. Yogurt whey can have a solids wt % in a range from 3 to 9% wt or from 4 to 8% wt or from 5 to 6% wt.

Yogurt whey has a wt % of protein that is less than whey produced from cheese (i.e., sweet whey). Sweet whey can have about 0.8% wt protein. Yogurt whey has less than 0.5% wt or less than 0.4% wt or about 0.3% wt protein. Yogurt whey can have a protein wt % in a range from 0.1 to 0.5% wt or from 0.2 to 0.4% wt.

Yogurt whey has more calcium than whey produced from cheese (i.e., sweet whey). Yogurt whey has at least two times or at least three times or at least 4 times the amount of calcium as sweet whey. Yogurt whey can have about 100 mg/100 g or more of calcium. Yogurt whey contains calcium in a range from 100 to 150 mg/100 g.

Yogurt whey has galactose while sweet whey typically does not contain galactose. Yogurt whey can have at least 0.4% wt galactose or at least 0.5% wt galactose. Yogurt whey contains an amount of lactose that is similar to sweet whey. Yogurt whey and sweet whey contains about 70% wt lactose on a dry basis or is in a range from 50 to 75% wt lactose on a dry basis.

To be utilized in products such as food products, yogurt whey is pasteurized, concentrated and neutralized with a basic material. These processing steps can be performed in any order. For example the yogurt whey can be first pasteurized, then concentrated and then neutralized and optionally further dried to a powder. In other embodiments, the yogurt whey can be first neutralized, then pasteurized and then concentrated and optionally further dried to a powder. In some embodiments, the yogurt whey can be first concentrated, then neutralized and then pasteurized and optionally further dried to a powder.

Neutralizing the yogurt whey is accomplished with an addition of a basic material to form a neutralized yogurt whey. The neutralized yogurt whey has a pH that is greater than 5.0 or greater than 5.5 or greater than 6.0 or greater than 6.2. In many embodiments the neutralized yogurt whey has a pH in a range from about 6.0 to 6.5. The basic material can be any useful basic material. In many embodiments the basic material is a hydroxide such as alkali metal hydroxides or alkali earth metal hydroxides. Alkali metal hydroxides include sodium and potassium hydroxide. Alkali earth metal hydroxides include calcium and magnesium hydroxide. In some embodiments the basic material is a carbonate such as sodium bicarbonate.

Yogurt whey can be concentrated by removing water to any useful solids % or moisture content. The concentrated yogurt whey can be a liquid concentrate or a powder concentrate depending on the amount of water removed from the yogurt whey. Water can be removed by any useful method such as filtration or evaporation. In some embodiments water is removed by membrane separation techniques such as reverse osmosis, nanofiltration or ultrafiltration, for example. Yogurt whey concentrates can have a solids % in a range from about 20% wt to 90% wt. Yogurt whey concentrates can be pumped or transported in some embodiments have been neutralized (having a pH of greater than 5.0 or greater than 5.5 or greater than 6.0) and in other embodiments have not been neutralized (having a pH of less than 5.0).

Concentrated and neutralized yogurt whey can be dried utilizing any useful drying method. In many embodiments the yogurt whey can be dried with a drum dryer, an oven dryer, a freeze dryer, or any other known drying equipment or process. In many embodiments the dried yogurt whey is a yogurt whey powder having a moisture content of 5% wt or less, or 3% wt or less.

In embodiments, the concentrated and neutralized yogurt whey can be dried utilizing spray drying. Surprisingly it is found that when the concentrated and neutralized yogurt whey has a pH of about 6 or greater, the spray dried neutralized yogurt whey forms a free flowing powder.

In many embodiments, neutralized yogurt whey or powdered compositions have a pH of 6.0 or greater, at least 2% wt calcium, at least 1% wt galactose and at least 6% wt solids or a pH of 6.2 or greater, at least 3% wt calcium, at least 5% wt galactose and less than 5% protein.

In many embodiments, yogurt whey powdered compositions have at least 2% wt calcium, at least 5% wt galactose, less than 5% wt protein and a moisture content of 5% wt or less or 3% wt or less. In many embodiments, yogurt whey powdered compositions have at least 3% wt calcium, at least 5% wt galactose, less than 5% wt protein and a moisture content of 5% wt or less or 3% wt or less. Yogurt whey and sweet whey contains about 70% wt lactose on a dry basis or is in a range from 50 to 75% wt lactose on a dry basis.

The concentrated and neutralized yogurt whey or yogurt whey powder can be incorporated into a food product. The neutralized and concentrated yogurt whey or yogurt whey powder can replace all or a portion of the sweet whey in products such as food products, for example. The concentrated and neutralized yogurt whey or yogurt whey powder can be utilized as food product bulking agent, sweetening agent and nutrient fortificant.

The concentrated and neutralized yogurt whey or yogurt whey powder can be utilized as food product bulking agent and replace all or a portion of sweet whey that is added as a bulking agent. The concentrated and neutralized yogurt whey or yogurt whey powder can be utilized as food product bulking agent and replace all or a portion of maltodextrin that is added as a bulking agent to food products. These food products include cereals, soups, yogurts, frostings, fillings, dry cheeses or dry spice mixes, cake mixes and other baking products or meal products.

The concentrated and neutralized yogurt whey or yogurt whey powder can be utilized as a sweetening agent and replace all or a portion of typical sweetening agents that are added to food products. The concentrated and neutralized yogurt whey or yogurt whey powder can be utilized as a sweetening agent and replace all or a portion of dextrose that is added to food products such as beverage, bakery or snack products, for example. Other food products include cereal and cereal coatings.

The concentrated and neutralized yogurt whey or yogurt whey powder can be utilized to replace all or a portion of milk permeate, skim milk powder or non-fat dry milk that are added to food products.

The concentrated and neutralized yogurt whey or yogurt whey powder can be utilized as a nutrient fortificant. The concentrated and neutralized yogurt whey or yogurt whey powder contains calcium at useful fortificant levels. For example, the concentrated and neutralized yogurt whey or yogurt whey powder can contain 3% wt or greater of calcium, on a dry basis.

Food products described herein incorporate the neutralized yogurt whey. The food product can be a bakery product, a beverage product, a snack product, a confectionery product, a soup product, a dry meal product, a cereal or a dairy product, for example. The neutralized yogurt whey can be provided in the food product in any useful level. In many embodiments the neutralized yogurt whey is a free flowing solid having a moisture content of less than 5% wt or less than 3% wt. In some embodiments the neutralized yogurt whey is liquid flowing material having a solids % in a range from about 20% wt to 90% wt.

Examples of food products that may incorporate the neutralized yogurt whey or yogurt whey described herein include a confectionary, a confectionary coating, a gum, a bakery product, an ice cream, a dairy product, a fruit snack, a chip or crisp, an extruded snack, a tortilla chip or corn chip, a popcorn, a pretzel, a nut, a snack bar, a meal replacement, a ready meal, a soup, a pasta, a canned food, a frozen processed food, a dried processed food, an instant noodle, a chilled processed food, an oil or fat, a sauce dressing or condiment, a dip, a pickled product, a seasoning, a baby food, a spread, a chip or a crisp such as chips or crisps comprising potato, corn, rice, vegetable (including raw, pickled, cooked and dried vegetables), a fruit, a grain, a soup, a seasoning, a ready-to-eat breakfast cereal, hot cereal or dough, or an ice cream such as a frozen yogurt, a dairy products such as a yogurt or cheese or cheese powders, ready meal, a soup, a pasta, a canned food, a frozen processed food, a dried processed food, an instant noodle, or a chilled processed food, a beverage including beverages that include fiber or protein, energy drinks, or dairy beverages. Further useful products for the inclusion of the neutralized yogurt whey include pet food, an animal product, and a medical food.

In embodiments, the neutralized yogurt whey or yogurt whey described herein can be included in a baking product. The baking product can be in the form of a dry mix, refrigerated or frozen dough or baked product that is refrigerated, frozen or kept at room temperature. Exemplary baking products include pie shells, pancake mixes and biscuit mixes and dough and baked products, sweet rolls and the like.

In embodiments, the neutralized yogurt whey or yogurt whey described herein are incorporated into a nutritional supplement, a vitamin supplement, an infant formula product, a medicinal or pharmaceutical product, or the like.

In embodiments, a food product is a processed food product. Food processing includes the transformation of raw ingredients into food or transforming forms of food into other forms of food. Food processing often includes using harvested crops or animal products to produce marketable and often long shelf-life products. Processed food products include products for which additional processing by a consumer may be desired prior to consumption. For example, a food product for which heating, cooking, baking, or the like, may be desired by a consumer prior to consumption may be a processed food product despite not being in its final form (e.g., being unheated, uncooked, unbaked, etc.) prior to delivery to a consumer.

Particularly suitable food products including soup, meal kits, grain products such as ready-to-eat cereals, snacks, bars and baked dough, and dairy products such as ice cream, yogurt and cheese. For the purposes of the present disclosure "grain" includes grain and pseudograin. Examples of food grains include corn; sorghum; fonio; millet such as pearl millet, proso millet, finger millet, foxtail millet, Japanese millet, kodo millet and the like; Job's tears; wheat; rice; rye; barley; oat; tritacle; wild rice; teff; amaranth; quinoa; buckwheat; and the like. The neutralized yogurt whey or yogurt whey described herein can also be used in connection with soup, broth, sauce (such as basting sauce), various seasoning sauces, ketchup, dressings, and other like foods.

Example

Yogurt whey from the production of Greek yogurt was characterized and compared to a typical sweet whey product as described in Dried Dairy Handbook, WI Center for Dairy Research, Smith, Karen. The results of this analysis is shown in the table below.

TABLE 1

|  | Sweet Whey 12.5% solids | Yogurt Whey 5.5% solids |
| --- | --- | --- |
| pH | 6.2 | 4.5 |
| Fat % | 0.3 | 0.03 |
| Protein % | 0.8 | 0.11 |
| Carbs % | 4.8 | 3.9 |
| Moisture % | 3.8 | 1.6 |
| Ash % | 0.5 | 0.64 |
| Lactose % | 4.8 | 3.4 |
| Galactose % | 0 | 0.5 |
| Ca mg/100 g | 45 | 120 |
| P mg/100 g | 45 | 61 |
| Total Acidity | 0.10 |  |

This yogurt whey was concentrated to about 35% wt solids in an evaporator and then pasteurized and neutralized with a 10% solution of calcium hydroxide ($Ca(OH)_2$) to pH targets of 5.5, 6.0, 6.25 and 6.5. Each of these samples were then dried to less than 3% wt moisture. The samples that were neutralized to a pH of 6.0, 6.25 and 6.5 were found to be free flowing powders. It was surprising that the samples that were neutralized to a pH of 6.0, 6.25 and 6.5 were found to be free flowing powders while the sample neutralized to a pH of 5.5 was not a free flowing powder.

The 6.5 pH sample (referred to as "Yogurt Whey") was characterized against typical sweet whey and typical whey permeate. The results of this characterization is illustrated in Table 2 below.

TABLE 2

|  | Sweet Whey | Whey Permeate | Yogurt Whey |
| --- | --- | --- | --- |
| pH | 6.0 | 6.0 | 6.5 |
| Fat % | 1.0 | 0.10 | 0.26 |
| Protein % | 12 | 3.6 | 4.2 |
| Carbs % | 73 | 86 | 77 |
| Moisture % | 3.8 | 1.6 | 2.8 |
| Ash % | 7.3 | 8.2 | 16 |
| Lactose % | 65 | 87 | 53 |
| Galactose % | 0 | 0 | 7.0 |
| Ca % | 0.58 | 0.36 | 3.5 |
| P % | 0.63 | 0.57 | 1.1 |

Thus, embodiments of FOOD PRODUCTS WITH YOGURT WHEY are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A food product comprising neutralized yogurt whey, the neutralized yogurt whey comprising:
   a pH of 6.0 or greater;
   50 to 75% wt lactose on a dry basis;
   at least 100 mg calcium per 100 grams of yogurt whey;
   at least 0.5% wt galactose; and
   at least 10% wt solids, wherein the neutralized yogurt whey is a free flowing liquid.

2. The food product according to claim 1, wherein the neutralized yogurt whey comprises:
   a pH of 6.2 or greater;
   at least 3% wt calcium;
   at least 5% wt galactose; and
   less than 5% wt protein.

3. The food product according to claim 2, wherein the food product is a bakery product.

4. The food product according to claim 2, wherein the food product is a beverage product.

5. The food product according to claim 2, wherein the food product is a snack product.

6. The food product according to claim 2, wherein the food product is a confectionery product.

7. The food product according to claim 2, wherein the food product is a soup product.

8. The food product according to claim 2, wherein the food product is a dry meal product.

9. The food product according to claim 2, wherein the food product is a dairy product.

10. The food product according to claim 2, wherein the food product is a cereal product.

11. The food product according to claim 1, wherein the neutralized yogurt whey comprises 20-90 wt. % solids.

12. The food product according to claim 1, wherein the neutralized yogurt whey further comprises a basic material selected from the group consisting of: sodium hydroxide, potassium hydroxide, an alkali earth metal hydroxide and a carbonate.

13. The food product according to claim 12, wherein the basic material is selected from the group consisting of: sodium hydroxide and potassium hydroxide.

* * * * *